(12) United States Patent  (10) Patent No.: US 8,233,478 B2
Roos et al.  (45) Date of Patent: Jul. 31, 2012

(54) METHOD AND AN APPARATUS FOR DATA STORAGE AND COMMUNICATIONS

(75) Inventors: Joachim Roos, Nacka (SE); Karl Henriksson, Skarpnack (SE); Tobias Roos, Bromma (SE); Ola Bengtsson, Sundbyberg (SE)

(73) Assignee: Edgeware AB, Stockholm (SE)

( * ) Notice: Subject to any disclaimer, the term of this patent is extended or adjusted under 35 U.S.C. 154(b) by 297 days.

(21) Appl. No.: 12/585,355

(22) Filed: Sep. 11, 2009

(65) Prior Publication Data

US 2010/0067543 A1    Mar. 18, 2010

Related U.S. Application Data

(60) Provisional application No. 61/136,573, filed on Sep. 16, 2008.

(30) Foreign Application Priority Data

Sep. 12, 2008  (SE) ........................................ 0801954

(51) Int. Cl.
*H04L 12/28* (2006.01)
(52) U.S. Cl. ........................................ 370/389; 370/312
(58) Field of Classification Search ................. 370/389, 370/360, 367, 377, 379, 384, 386, 396, 395.2, 370/395.3, 410, 420, 426, 428, 429
See application file for complete search history.

(56) References Cited

U.S. PATENT DOCUMENTS

| | | | |
|---|---|---|---|
| 2003/0065817 A1* | 4/2003 | Benchetrit et al. | 709/245 |
| 2005/0039104 A1* | 2/2005 | Shah et al. | 714/776 |
| 2005/0050358 A1* | 3/2005 | Lin | 713/201 |
| 2006/0034248 A1 | 2/2006 | Mishra et al. | |
| 2006/0047928 A1* | 3/2006 | Bhasin et al. | 711/162 |
| 2006/0221946 A1 | 10/2006 | Shalev et al. | 370/389 |

FOREIGN PATENT DOCUMENTS

| | | |
|---|---|---|
| GB | 2 441 577 A | 12/2008 |
| WO | WO 2008/028834 | 3/2008 |
| WO | WO 2008/028835 | 3/2008 |
| WO | WO 2008/028836 | 3/2008 |

OTHER PUBLICATIONS

Robert Hinden, Bolt Beranek and Newman Inc., "Design of TCP/IP for the TAC," Jan. 1981, pp. 1-27, IEN-166, XP002558558.
Information Sciences Institute, University of Southern California, "Transmission Control Protocol DARPA Internet Program Protocol Specification," Sep. 1981, pp. 1-85, XP015006775A, prepared for Defense Advanced Research Projects Agency, Information Processing Techniques Office, RFC:793.
D. James Gemmell et al., "Multimedia Storage Servers: A Tutorial," 8153 Computer May 28, 1995, No. 5, pp. 40-49, XP000517832.
Office Action issued in Swedish Priority Application No. SE 0801954-9.
Forouzan, Behrouz A. TCP/IP Protocol Suite, McGraw-Hill, 2006, $3^{rd}$ edition, ISBN 0-07-296772-2, se sidan 285-287 och 299-301.

* cited by examiner

*Primary Examiner* — Brenda H Pham
(74) *Attorney, Agent, or Firm* — Nixon & Vanderhye PC

(57) ABSTRACT

A method is disclosed of using a plurality of simultaneous communication sessions to allow two-way communication where data compositions are simultaneously sent from an apparatus to a large plurality of remote units, while maintaining a high performance of the apparatus, each session involving sending a data composition to a respective of a plurality of remote units through a communication network, the data compositions being stored in a storage unit. The method includes receiving from the storage unit streams of data composition sub-sets, and providing for each of the communication sessions a data queue, and storing data of the streams of data composition sub-sets in the data queues.

14 Claims, 9 Drawing Sheets

METHOD AND AN APPARATUS FOR DATA STORAGE AND COMMUNICATIONS

CROSS-REFERENCE TO RELATED APPLICATION

This application claims the benefit of Provisional Application No. 61/136,573, filed Sep. 16, 2008, and Swedish Patent Application SE 0801954-9, filed Sep. 12, 2008, the entire contents of which are hereby incorporated by reference in this application.

TECHNICAL FIELD

The present invention relates to a method and an apparatus of using a plurality of simultaneous communication sessions, each session involving sending at least parts of data compositions to a corresponding plurality of remote units through a communication network.

BACKGROUND OF THE INVENTION

Transfer of data files to remote units through networks, such as the internet, puts large demands on processor capabilities, etc., when the files are large and the remote units are large in number. Specially, where data files are streamed individually to respective remote units, conventional storage and computation units, including hard drives, provides a limited capacity, and therefore the number of remote units that can be served with the use of such equipment is relatively low.

WO2008/028834 and WO2008/028835 disclose apparatuses for data streaming to a plurality of remote units, in which data files are pre-processed before being stored in a storage unit, whereby control data sets are created, and the data files being streamed using the control data sets, wherein a streaming unit receives from the storage unit, along with sub-sets of the data files, control data sub-sets, each giving a location in the storage unit of a further sub-set of the data file. This provides a possibility of obtaining a high performance with simultaneous data streaming to a very large number of remote units.

In certain communication protocols, such as the Transmission Control Protocol (TCP), two-way communication is included, at which messages, such as acknowledgements of received data, are sent in both directions between communicating units. There is a need to allow such two-way communication in cases of the type mentioned, where an apparatus sends simultaneously large data files to a large number of remote units, without large penalties on the performance of the apparatus.

BRIEF SUMMARY OF THE INVENTION

It is an object of the invention to allow two-way communication in cases where data files are sent simultaneously from an apparatus to a large number of remote units, while maintaining a high performance of the apparatus.

This object is reached with a method that uses a plurality of simultaneous communication sessions, each session involving sending at least parts of a data composition to a respective of a plurality of remote units through a communication network, the data compositions being stored in a storage unit, the method comprising the steps of:

receiving from the storage unit a plurality of streams of data composition sub-sets of respective data compositions, providing for each of the communication sessions a data queue, and storing data of the streams of data composition sub-sets in the data queues, providing acknowledgement pointers at the data queues, retrieving data portions from the data queues and sending streams of the data portions to the respective remote units, receiving streams of acknowledgement data sets from the respective remote units, from which acknowledgement data sets reception by the respective remote unit of data portions can be determined, and adjusting, upon receiving the acknowledgement data sets, the acknowledgement pointers at the data queues corresponding to the remote units from which the acknowledgement data sets where received.

The data compositions can be a data file, a group of data files or a media data flow or any other type of data structure for any purpose, and further examples are given below. The invention provides for very efficient data delivery where an apparatus is involved with a plurality of simultaneous communication sessions, which are highly asymmetric in that payload data, i.e. data portions of the data compositions, is sent to the remote units and mainly communication control data is sent back.

In embodiments of the invention, a data composition is received from the storage unit in the form of a stream of data composition sub-sets, which are parts of the respective data composition. The streams of data composition sub-sets can be received simultaneously from the storage unit. This can involve said streams being received via one or more data buses. Also, the data composition sub-sets for one single communication session can be received intermediately in time with data composition sub-sets for other communication sessions.

For each communication session a data queue in the form of a buffer is provided, and as exemplified below, the data queues are suitably provided in a memory, herein referred to as an output memory, e.g. in the form of a DRAM. As the data composition sub-sets are received from the storage unit, data thereof is stored in one of the data queues.

It should also be noted that all of, or only parts of, a data composition sub-set could be stored in the respective data queue. For example, as described in WO2008/028836, where the data composition is a media data file to be streamed to the remote unit, an editing process could be involved to edit the file for trick play functions, such as fast forward or rewind, at which parts of data composition sub-sets received from the storage unit could be removed before being stored in the data queue.

Upon storage of the data in the data queues, data portions can be retrieved therefrom and sent in streams to the respective remote units, so a to provide a plurality of simultaneous data flows, each provided for a respective communication session. This can involve said streams being sent via one or more ports being physical interfaces, and the data portion stream of one single communication session being sent intermediately in time with data portions of other sessions.

Determining from the acknowledgement data sets reception by the remote unit of data portions can involve, in addition to determining the reception of any data of the data portions, determining that the data portions where correctly received, i.e. that they where received in an un-corrupted state. Upon receiving acknowledgement data sets, corresponding acknowledgement pointers are adjusted in dependence of the acknowledgement data sets. Since the acknowledgement pointer in each data queue is indicative of data having reached the respective remote unit, it also gives an indication on which data that can be freed from the buffer of the respective data queue. The reception of an acknowledgement data set preferably involves determining the identity of the data queue used in the communication session with the remote unit that sent the acknowledgement data set. Where the communication sessions are provided using the IP/TCP protocol, such identification can be done by mapping the IP-address of the remote unit with an internal identifying denotation of the communication session or the data queue used therefore.

Since data of the data compositions are stored in data queues from which data portions are retrieved and sent to remote units, and the data queues are provided with pointers which are adjusted as remote unit data reception is acknowledged, the invention provides for a very effective and integrated handling of simultaneous data flows to a large number of remote units through a communication network. The invention makes it possible to provide an apparatus that is hard-coded for said method steps, more generally to provide an apparatus that can carry out said method steps without any CPU or software involvement, thereby being able to provide a very high performance in data storage retrieval, data sending and data reception acknowledgement.

Preferably, the method comprises receiving from the storage unit, for each stream of data composition sub-sets, a stream of control data sub-sets, each control data sub-set comprising data corresponding to a location in the storage unit of a further data composition sub-set in the respective stream of data composition sub-sets.

In embodiments of the invention provides for the storage unit to be adapted to store, for each data composition, a control data set, each divided into a plurality of control data sub-sets, each comprising data corresponding to a location in the storage unit of a data composition sub-set of the respective data composition. Thereby, a stream of control data sub-sets, giving the storage location of further data composition sub-sets, can be received simultaneously with each stream of data composition sub-sets. This provides directly, during retrieval of the data composition, information on physical storage locations of further data composition sub-sets. This means that there is no need for mapping, as in the case of traditional data storage systems, of a representation of the data composition as a logic file to a physical storage address. It should be noted that the control data sub-sets can be stored, as exemplified below, in physical conjunction with the respective data composition sub-set, or in a separate part of the storage unit.

The simultaneous reception with the data composition sub-sets of control data sub-sets for retrieving further data composition sub-sets, makes it possible to handle the data retrieval with only physical storage.

Preferably, the size of the data portions retrieved from each data queue is predetermined, and a streaming rate at which data portions are to be sent to the respective remote unit is determined for the streams of data portions, and/or for at least one group of streams of data portions. This gives a possibility to avoid large data bursts in the output of the data, and instead provide evenly spaced data packets in each stream of data, giving control of the traffic to the remote units, so as to avoid delays and resending of data packets. More generally, apart from the apparatus sending simultaneously data files to a large number of remote units, a two-way communication with flow control and a resending capacity in case of lost or corrupted data portions is allowed. Preferably, determinations whether to send data portions from the data queues, or a sub-set of the data queues, is made in a cyclic manner, each determination being based on the streaming rate for the respective data queue. This secures fair distribution of handling of the stream, while also reducing the risk of data bursts, specially where the size of the data portions is small, since data portions of a large number of different streams are interleaved with a fine granularity. Preferably, the method comprises providing at each data queue a window size pointer, indicative of the maximum amount of data that is allowed to be sent without reception of the data by the respective remote unit having been determined.

Preferably, the method comprises the step of adjusting, during a communication session, a streaming rate in the sending of data portions to a remote unit. Thus, the streaming rate of data transferred in a communication session can be adjusted, for example depending on whether acknowledgement data sets indicate that data packets sent to the respective remote unit have been lost.

Preferably, the method comprises the step of storing in at least one of the data queues, along with data of the respective stream of data composition sub-sets, a message data set. The message data set is not included in the data composition to be transferred from the storage unit to the remote unit. Instead it could be originating from another source, such as a central processing unit of the apparatus. The embodiment makes it possible to include in the communication session any message to the remote unit, which message may not be related to the transfer of the data composition at all. However, the message can be sent using the same connection as that of the transfer of the data composition, and thereby, no separate connection needs to be established. Also, the message can be sent benefiting from the same mechanisms, including acknowledgements and resend capacities, as that involved with the sending of the data compositions.

The object is also reached with an apparatus adapted to participate in a plurality of simultaneous communication sessions each involving sending at least parts of a data composition to a respective of a plurality of remote units through a communication network, the data compositions being stored in a storage unit, the apparatus comprising a communications unit being hard-coded to receive from the storage unit a plurality of streams of data composition sub-sets of respective data compositions, the communications unit being hard-coded to provide for each of the communication sessions a data queue, and to store data of each of the streams of data composition sub-sets in at least one of the data queues, characterized in the communications unit is hard-coded to provide an acknowledgement pointer at each data queue, to retrieve data portions from the data queues and to send streams of the data portions to the respective remote units, to receive streams of acknowledgement data sets from the respective remote units, from which acknowledgement data sets reception by the respective remote unit of data portions can be determined, and to adjust, upon receiving the acknowledgement data sets, the acknowledgement pointers at the data queues corresponding to the remote units from which the acknowledgement data sets where received.

Preferably, where at least some of the communication sessions involve the use of the Transport Control Protocol, the communications unit is hard-coded to receive a data packet from a remote unit, to detect the presence in the data packet of a SYN-flag according to the Transport Control Protocol, and to send to the remote unit, in response to the data packet with the SYN-flag, a data packet with an acknowledgement of the data packet with the SYN-flag. Thereby, no software handling, including the use of an IP-stack, has to be involved at the reception of the data packet with the SYN-flag. Since such software handling is time and resource consuming, said hard-coded handling of the data packet with the SYN-flag makes the apparatus, more particularly a software controlled central processing unit (CPU) of the apparatus, protected against so called denial-of-service (DoS) attacks, i.e. attempts to make a computer resource unavailable to its intended users, involving saturating the target machine with external communications requests, such that it cannot respond to legitimate traffic, or responds so slowly as to be rendered effectively unavailable. The said quick hard-coded handling will prevent such saturation.

Preferably, the communications unit is hard-coded to receive a data packet from a remote unit, to detect the presence in the data packet of an acknowledgement data set. Thereby, where the communication sessions include data which is not directly intended for the sending of the data from the data queues, such data can be forwarded to a software unit, whereas the acknowledgement data sets can be detected and handled in a hard-coded unit. For example, parts of a message received from a remote unit may be intended for a unit, such as a CPU, not directly involved in the data transfer from the data queues. The communications unit can also be hard-coded to erase incoming data packets without any further measure, for example where packets received are incorrectly addressed.

Preferably, components of the inventive apparatus are hard-coded whereby each hard-coded component work in parallel independent of each other and don't need to be synchronized with other components or take the work performed by the other components into consideration Further advantageous embodiments of the apparatus are defined in the dependent claims 8-14.

BRIEF DESCRIPTION OF THE DRAWINGS

Below, embodiments of the invention will be described closer with reference to the drawings, in which.

DETAILED DESCRIPTION OF THE INVENTION

Figure 1:
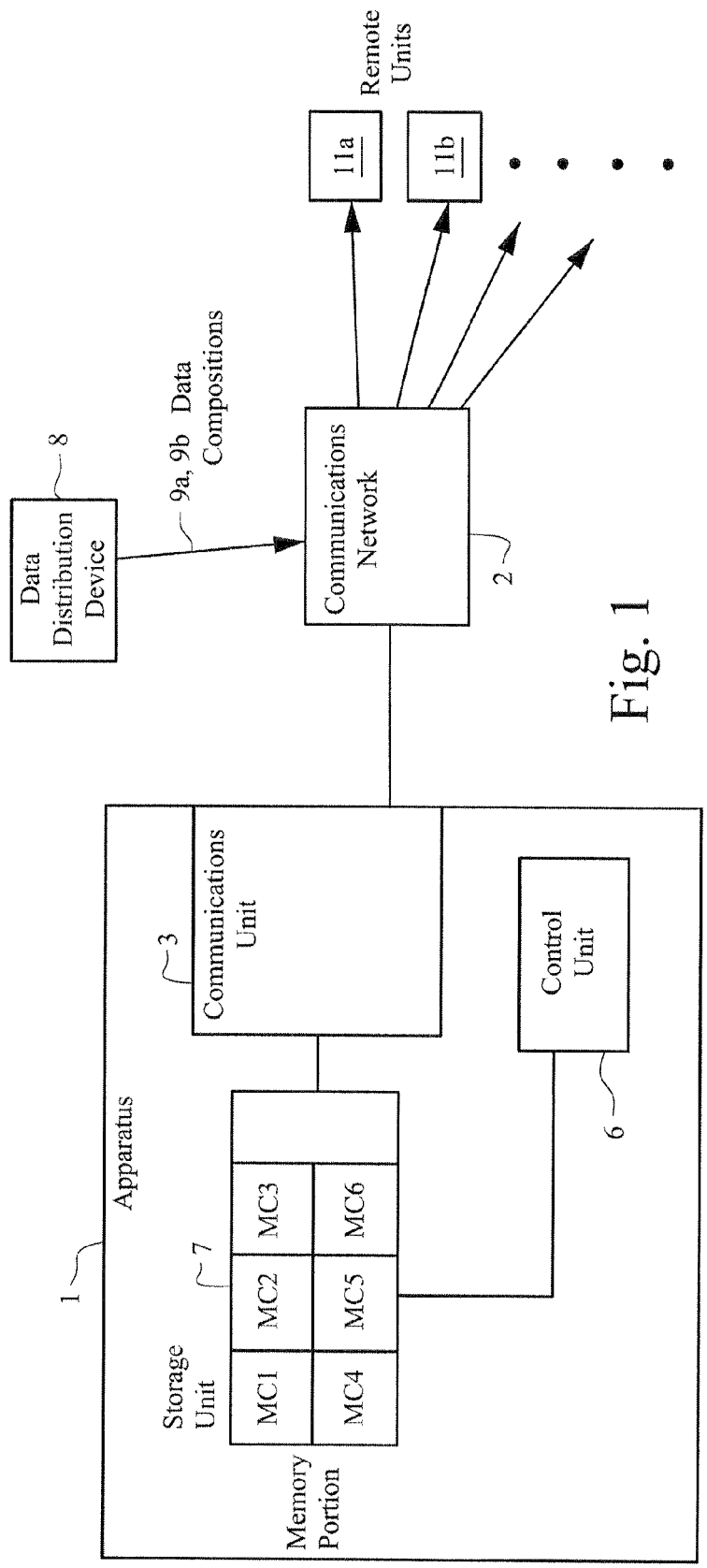
FIG. 1 is a block diagram of a communications network and devices connected thereto including an apparatus according to one embodiment of the invention, FIG. 2 block diagram of the apparatus in FIG. 1.

FIG. 1 depicts schematically a system with an apparatus 1, connectable to a communications network 2, e.g., in the form of an IP-network, for simultaneous communication sessions with a plurality of remote units 11a, 11b, also connectable to the network 2. The remote units 11a, 11b can be any kind of remote devices or user devices adapted to receive and process data, such as personal computers, set-top boxes, personal video recorders, or any combination thereof, where the data could be media data, program files, messages, or any other type of data.

This embodiment of the apparatus 1 comprises a communications unit 3, a control unit 6, and a storage unit 7, being connected to each other in a manner described closer below. The control unit 6 comprises a processor (CPU) and a memory.

The storage unit 7 may be any kind of storage device, for example including one or more hard drives. However, in this embodiment, the storage unit 7 comprises a solid state memory in the form of a plurality of interconnected so-called flash storage units, i.e. memories segmented into memory sectors. The storage unit 7 is adapted to store any form of data arranged in sets herein referred to as data compositions, which could be in the form of multimedia sequences, for example TV channel or radio transmissions, movies, music files, and/or advertisements, or other types of data files, such as program update files for personal computers. More generally, a data composition stored in the storage unit 7 can include any form of data, such as program data, or media data, whether audio, visual, text or code, provided separately or in any combination.

Figure 2:
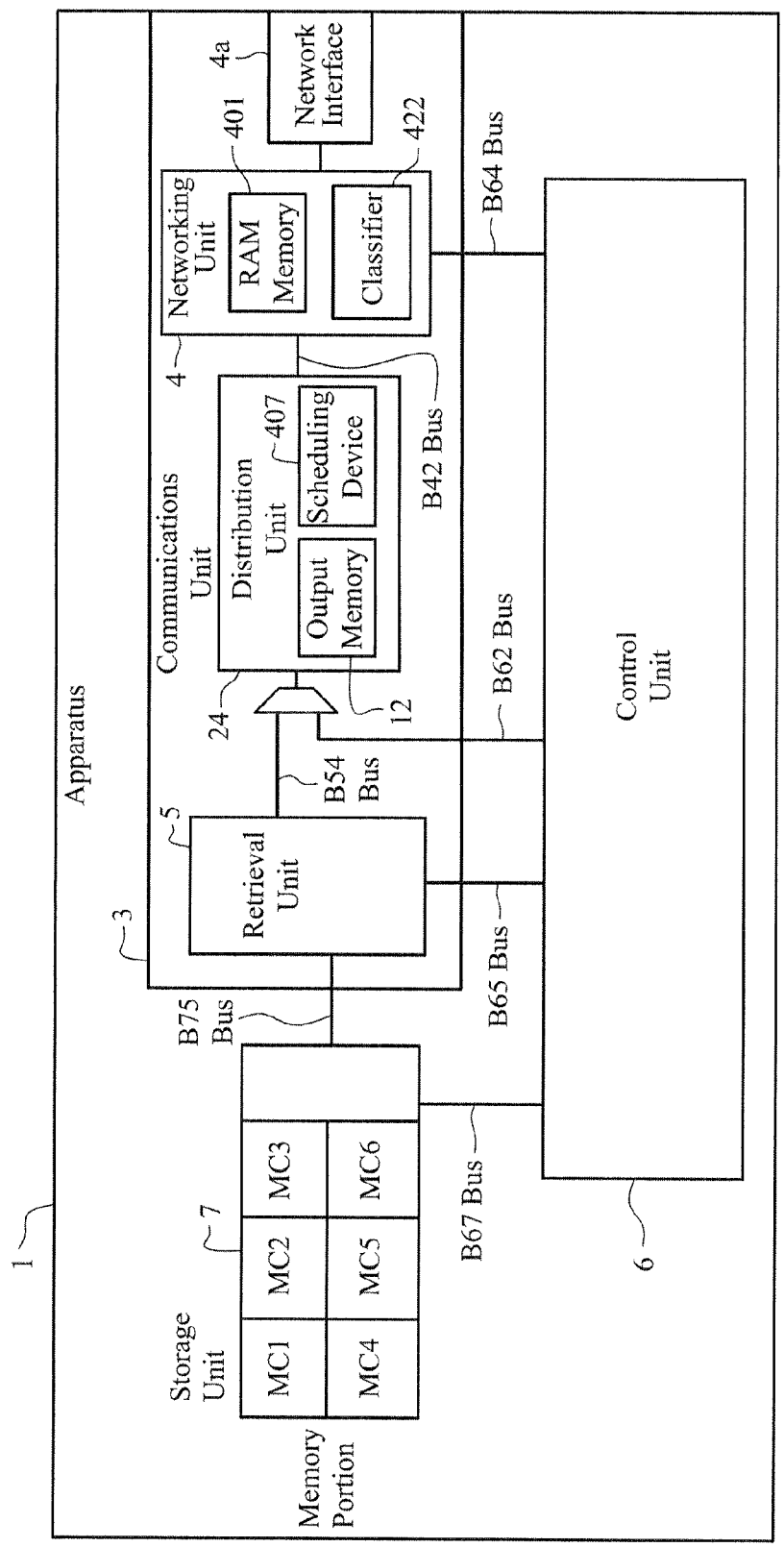

Reference is made to FIG. 2. In this embodiment, the communications unit 3 of the apparatus 1 comprises a networking unit 4, adapted to send and receive data to and from, respectively, the network 2, via a network interface 4a. The communications unit 3 also comprises a retrieval unit 5, and a distribution unit 24, in turn comprising an output memory 12, preferably a large solid state memory. The retrieval unit 5 is connected to the distribution unit 24 by a suitable bus B54. The retrieval unit 5 is connected to the storage unit 7 by a bus B75. The retrieval unit 5, the networking unit 4, and the storage unit 7 are connected to the control unit 6 by a respective bus B65, B64, B67, such as a PCI (Peripheral Component Interconnect) bus. The control unit 6 is connected to the distribution unit 24 by a bus B62, and the distribution unit 24 is connected to the networking unit 4 via a bus B42. In an alternative embodiment, the buses B65, B64, B67, B62 connecting the control unit 6 to said respective devices, can be replaced by one shared bus.

The networking unit 4 and the retrieval unit 5 are hard wired, i.e. hard-coded, with each of them comprising a programmed logic device in the form of a field programmable gate array (FPGA). Alternatively, any other suitable type of programmed logic device can be used, such as programmable array logic (PAL), programmable logic device (PLD), macrocell array, or an application specific integrated circuit (ASIC).

A hard-coded device or unit is thus a device or unit containing programmable logic comprising components that sometimes are called logic blocks and a hierarchy of reconfigurable interconnects that allow the blocks to be wired together. As mentioned, this could be either a fixed array, such as an ASIC or a programmable array, such as an FPGA, but it is not a processor, i.e. a central processing unit (CPU) executing a program.

The apparatus 1 is adapted to receive via the network 2 a plurality of data compositions 9a, 9b from one or more data distribution devices 8. The networking unit 4 is adapted to receive the data compositions 9a, 9b via the network interface 4a, and is hard-coded to detect the incoming traffic of data compositions 9a, 9b.

The streaming device 1 is adapted to store the data compositions 9a, 9b as they are received, at which the control unit 6 is adapted to allocate for each of the data compositions 9a, 9b a memory portion MC1-MC6 in the storage unit 7. The control unit 6 is also adapted to create and store a memory address scheme, for which each memory portion MC1-MC6 of the storage unit 7 is divided into a number of memory sectors, each of the same size.

Figure 3:
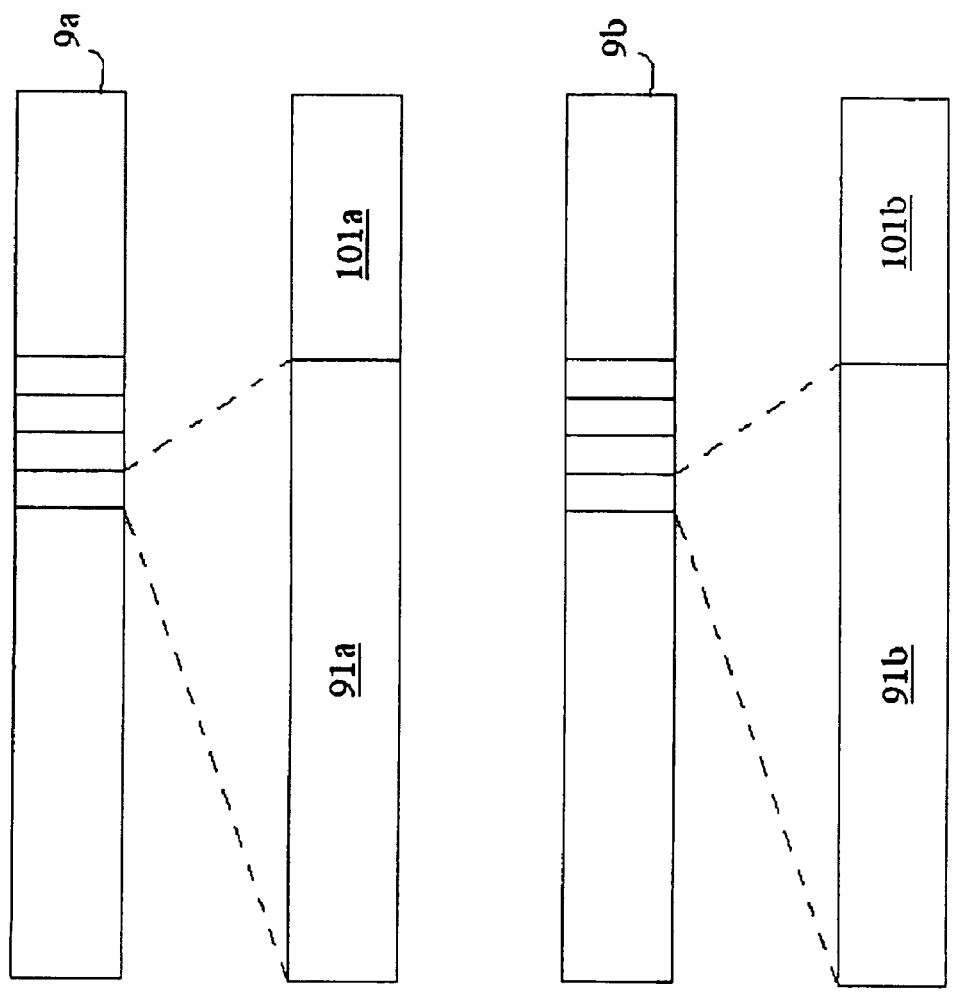
FIG. 3 is an illustration of data sets in the apparatus in FIG. 2.

In this embodiment, the control unit 6 is adapted to pre-process data compositions during reception before storage. Referring to FIG. 3, the control unit 6 is adapted to divide, in the pre-processing, each data composition 9a, 9b into a plurality of data composition sub-sets 91a, 91b.

The control unit 6 is also adapted to create, in the pre-processing of each data composition 9a, 9b, a control data set. Each control data set includes data for linking the data composition sub-sets 91a, 91b when retrieving the data composition from the storage unit 7. Referring to FIG. 3, each control data set comprises control data sub-sets 101a, 101b, each associated with a respective data composition sub-set 91a, 91b. The size of each pair of data composition sub-set 91a, 91b and control data sub-set 101a, 101b is adapted for occupying a single memory sector of the flash memory units of the storage unit 7.

Figure 4:
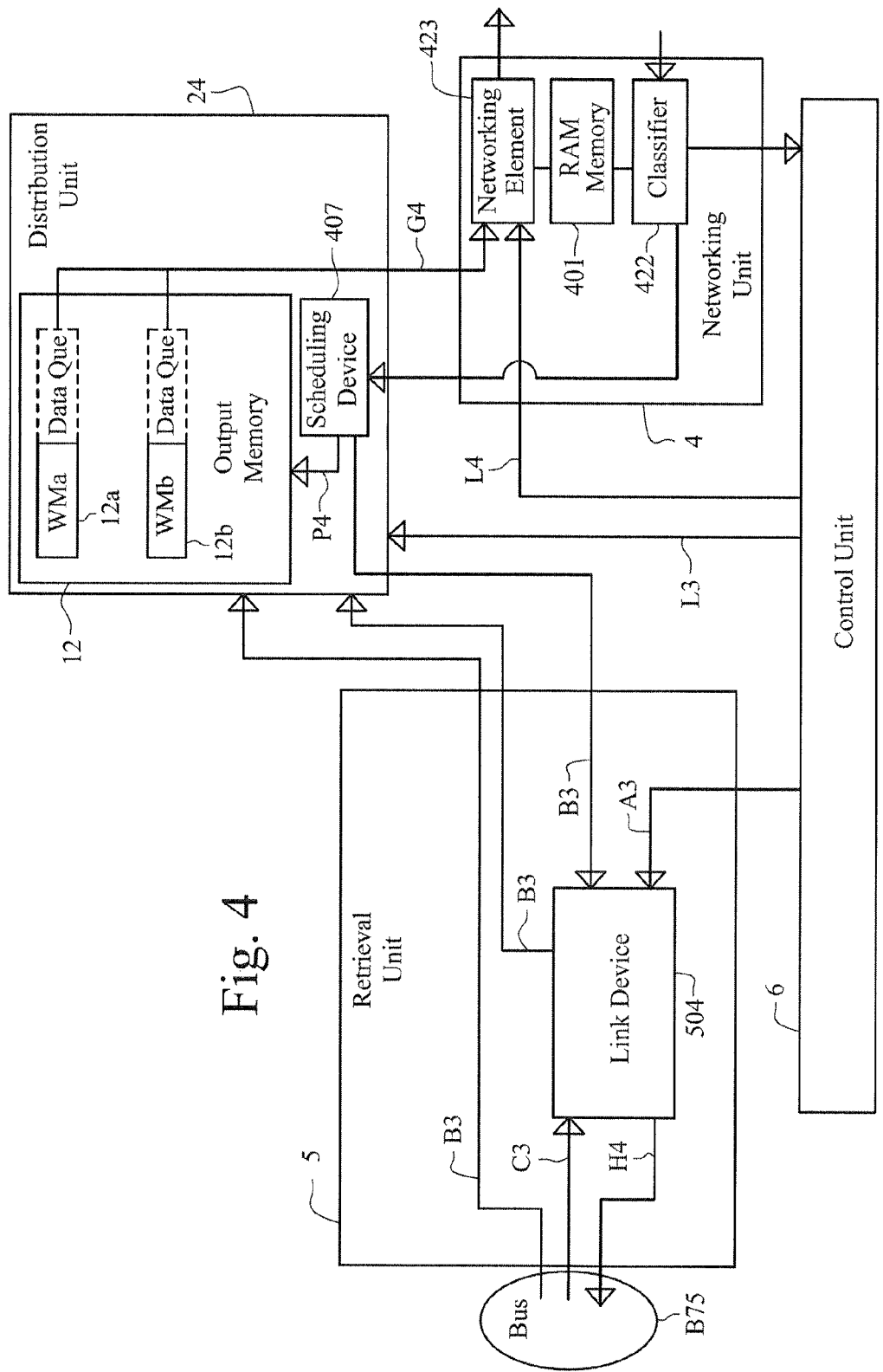
FIG. 4 is a block diagram of parts of the apparatus in FIG. 2.

Reference is made to FIG. 1, FIG. 2 and FIG. 4. The networking unit 4 is adapted to receive, via the network interface 4a, from the remote units 11a, 11b requests for content in any of the data compositions 9a, 9b. In addition, the networking unit 4 can also receive communication control data, including acknowledge data sets as described closer below.

In this embodiment, before such a request for the content of a data composition 9a, 9b is received, a communication session between the apparatus 1 and the respective remote unit 11a, 11b is established. More specifically, in this embodiment, communication sessions involve the use of the Transmission Control Protocol (TCP). As a first step in setting up a communication session, the networking unit 4 receives from the remote unit 11a, 11b a data packet with a header including according to TCP a so called SYN-flag. A classifier 422 of the networking unit 4 is adapted to detect the SYN-flag. The classifier 422 is also adapted to extract from the requests a network address of the respective remote unit 11a, 11b. Said network address is stored in a RAM memory 401 of the networking unit 4. The classifier 422 is further adapted to map an internal identification with the respective communication session, and to store this internal identification position in the RAM memory 401 so as to be mapped to the respective network address.

The classifier 422 is adapted to communicate the internal identification of the respective communication session to a scheduling device 407 of the distribution unit 24. The scheduling device 407 is adapted to communicate with the output memory 12, as indicated in FIG. 4 with the arrow P4, so as to allocate therein a data queue 12a, 12b for the respective communication session.

According to TCP, the networking unit 4 sends, in response to the data packet with the SYN-flag from the remote unit 11a, 11b, a data packet acknowledging the reception of the data packet with the SYN-flag, and in turn, the networking unit receives from the remote unit an acknowledgement of the acknowledgement of the data packet with the SYN-flag. Thereby, the communication session is established.

As mentioned above, the networking unit 4 being hard-coded to detect the presence of the SYN-flag, and to send to the remote unit an acknowledgement of the SYN-flag, means that no software handling has to be involved at the reception of the data packet with the SYN-flag, resulting in a durability against DoS-attacks. In an alternative embodiment, which is especially advantageous in this respect, the communication of the classifier 422 is adapted to not communicate to the internal identification of the respective communication session to the scheduling device 407 until after the reception from the remote unit of said acknowledgement of the acknowledgement of the SYN-flag. This will provide further protection against DoS-attacks in that no measure is taken to allocate a data queue in the output memory until an acknowledgement is received from the remote unit, something which does not usually occur in DoS-attacks. Also, since no data queue allocation in the output memory will be made if no acknowledgement is received from the remote unit, no time and resources have to be occupied in removing data queues in cases of DoS-attacks.

When the communication session is established, the networking unit 4 receives from the remote unit the request for one of the data compositions 9a, 9b, i.e., the request includes the identity of a data composition 9a, 9b. The networking unit 4, e.g. the classifier 422, is adapted to forward this identity, along with the internal identification of the communication session in question, to the control unit 6. The control unit 6 is adapted to determine whether the requested data composition is stored in the storage unit 7. The control unit 6 is further adapted provide a request response message indicating whether the requested data composition is stored in the storage unit 7. This request response message is sent, as indicated in FIG. 4 with the arrow L3, to the output memory 12 where it is stored in the data queue allocated for the communication session, to be sent to the remote unit. If the requested data composition is not stored in the storage unit, the communication session is terminated according to TCP.

The control unit 6 is adapted to identify, upon determination that the requested data composition is stored in the storage unit 7, and based on the identity of the respective requested data composition, a corresponding initial location in the storage unit 7, i.e. a storage location where the retrieval of the data composition will start. As a very advantageous result of the application of the invention, after the identification of the initial location in the storage unit, the CPU can be disengaged from the subsequent distribution of the data composition to the remote unit.

Reference is made to FIG. 3 and FIG. 4. The control unit 6 is further adapted to send to a link device 504 of the retrieving unit 5, as indicated by the arrow A3 in FIG. 4, the internal identification of the respective communication session and the corresponding initial storage location. Based thereon, the link device sends an initial read request to the storage unit 7.

In response to read requests from the scheduling device 407 to the link device 504, indicated in FIG. 4 with an arrow K3, the retrieval unit 5 receives data composition sub-sets 91a, 91b (FIG. 3) from the storage unit 7. The retrieval unit 5 is adapted to send the retrieved data composition sub-sets 91a, 91b to the output memory 12, as indicated by the arrow B3 in FIG. 4. However, in certain embodiments, such as in trick-play video streaming applications, exemplified below with reference to FIG. 5, the retrieval unit 5 is adapted to send to the output memory 12 data composition sub-sets that are results of editing based on the data composition sub-sets 91a, 91b retrieved from the storage unit 7.

The link device 504 is adapted to receive from the storage unit 7 control data sub-sets 101a, 101b (FIG. 3), as indicated by the arrow C3 in FIG. 4, for further read requests to the storage unit 7. As exemplified below with reference to FIG. 5, each control data sub-set 101a, 101b gives the address in the storage unit 7 of a subsequent data composition sub-set. In response to a further read request from the scheduling device 407 to the link device 504, control data sub-set 101a, 101b is used by the link device 504 to retrieve a further data composition sub-set 91a, 91b (FIG. 3) and a further control data sub-set 101a, 101b from the storage unit 7. This provides for each communication session a stream of data composition sub-sets 91a, 91b and simultaneous stream of control data sub-sets 101a, 101b. Thereby, the data composition sub-sets 91a and control data sub-sets 101a for one communication session is received intermediately in time with data composition sub-sets 91b and control data sub-sets 101b for other communication sessions.

Figure 5:
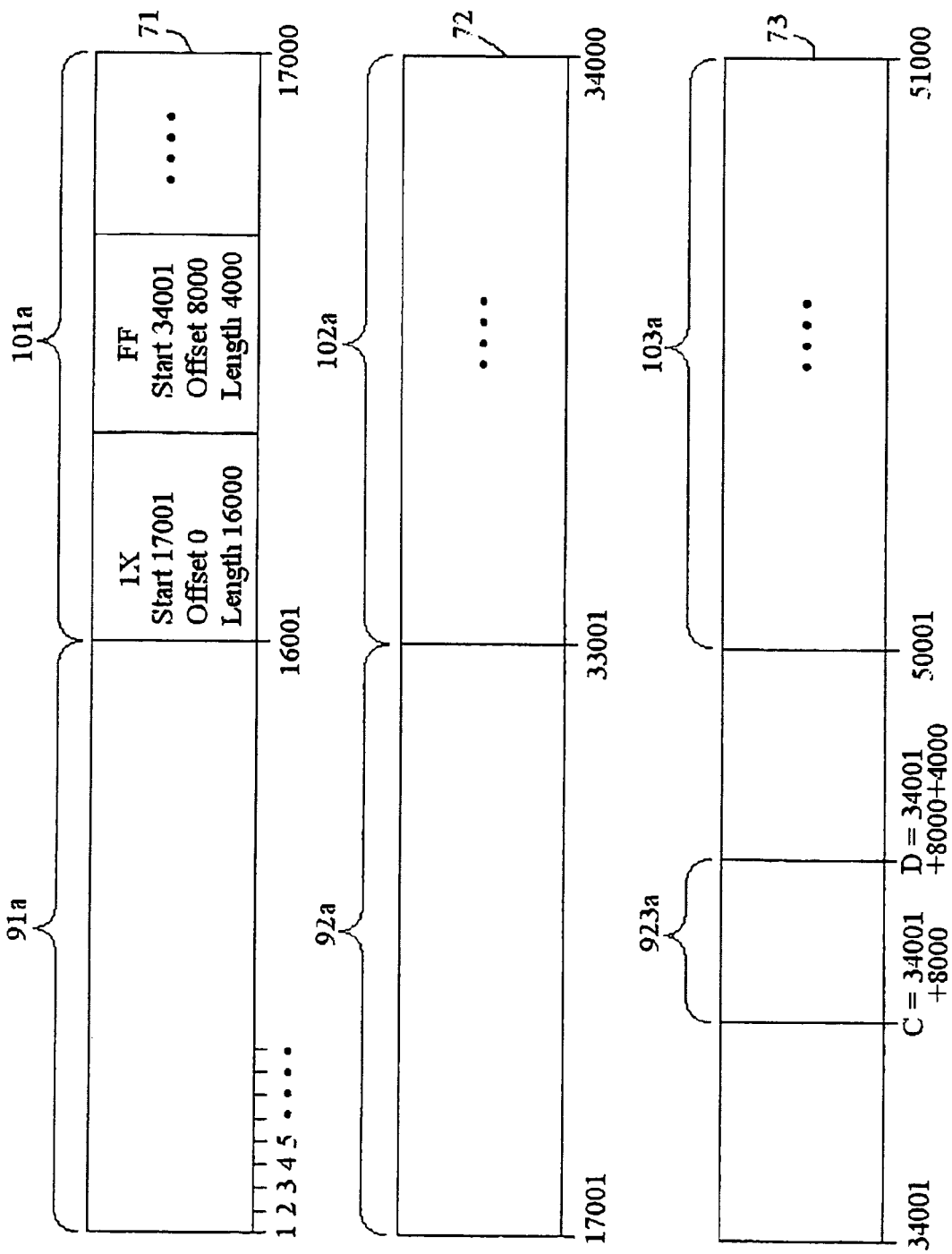
FIG. 5 is a block diagram of memory sectors in a storage unit in the apparatus in FIG. 2.

FIG. 5 shows an example of how memory sector locations in the storage unit 7 are accessed. Three pairs of data composition sub-sets 91a, 92a, 93a and control data sub-sets 101a, 102a, 103a are in this example stored in consecutive first, second and third memory sectors 71, 72, 73 of the storage unit 7. It should be noted that, instead of being consecutive, the first, second and third memory sectors 71, 72, 73 could be placed in entirely different locations in the storage unit 7. In all memory sectors 71, 72, 73, the memory space available for data composition data and control data is the same, in this example 16000 bytes and 1000 bytes, respectively.

In this example, the data composition is a video data file, and the control data thereof is adapted to trick-play modes that can be requested from the remote units 11a, 11b, as described closed in WO2008/028836, included herein by reference. Thus, the retrieval unit 5 is adapted to register such trick-play mode requests and provide data composition sub-sets to the data queues 12a, 12b in dependence thereon, as mentioned here below.

Where trick-play is not requested, after having retrieved data from the first memory sector 71, the retrieval unit 5 determines, from a first edit portion (1×) of the first control data sub-set 101a, the memory address (17001) of the start of the second memory sector 72. The retrieval unit 5 also determines from the first edit portion (1×) of the first control data sub-set 101a the data composition sub-set 92a within the second memory sector 72 that is to be sent to the remote unit. More specifically, the start of this data composition sub-set 92a is given as an offset from the start of the second memory sector 72 by 0 bytes and the length within the second memory sector 72 of this data composition sub-set 92a is 16000 bytes.

If instead the remote unit 11a, 11b has requested a trick-play mode in the form of a fast forward mode FF1, after having retrieved data from the first memory sector 71, the retrieval unit 5 determines from a second edit portion (FF) of the first control data sub-set 101a the memory address (34001) of the start of the next memory sector from which data is to be retrieved, which in this case is the third memory sector 73. Thereupon, all data composition data and control data in the third memory sector 73 will be retrieved from the storage unit. The retrieval unit 5 also determines, from the second edit portion (FF) of the first control data sub-set 101a, a data composition sub-set 923a that is to be sent to the remote unit. The location of this data composition sub-set 923a is given as an offset from the start of the third memory sector 73 by 8000 bytes and a length within the third memory sector 73 by 4000 bytes. The retrieval unit 5 is adapted to edit the contents of data retrieved from the third memory sector 73 accordingly, so that the data composition sub-set 923a sent to the data queue will contain all data in the interval [C, D] in FIG. 5.

Reference is made to FIG. 4. The output memory 12 presents a plurality of data queues 12a, 12b corresponding to the plurality of communication sessions, and allocated as mentioned above. The scheduling device 407 is adapted to make a cyclic sequence of determinations regarding the data queues 12a, 12b whether to send further read requests to the storage unit 7, and works in this respect as a scheduler for read instructions to the storage unit 7.

As indicated in FIG. 4, each data queue 12a, 12b is provided with a respective threshold level WMa, WMb in the respective FIFO queue. When determining whether to request more data for a specific data queue 12a, 12b, the scheduling device 407 is adapted to compare the amount of data temporarily stored in the data queue to the respective threshold level WMa, WMb, and to request more data from the storage unit 7 if the amount of data stored is below the respective threshold level WMa, WMb. Thereby, the scheduling device 407 sends a read request to the link device 504, which, as indicated by the arrow H4 in FIG. 4, based on the memory sector address in the control data sub-set, sends to the storage unit 7 a request for a further data composition sub-set and a further control data sub-set. Subsequent data composition sub-sets are forwarded to the output memory 12. The output memory 12 is adapted to receive periodically from the link device 504 data, as indicated by the arrow M4 in FIG. 4, identifying the data queue 12a, 12b for which a request is currently being sent to the storage unit 7. Based on this information, a data queue 12a, 12b is identified for receiving a data composition sub-set from the retrieval unit 5.

It should be noted that the threshold levels WMa, WMb can be set individually and differently for the data queues 12a, 12b, or to be the same for a group of data queues or for all data queues.

Data from all data queues 12a, 12b shares one or more common output ports of the apparatus 1. Therefore, scheduling has to be involved determining the order in which data is to be sent from the data queues 12a, 12b. The line G4 in FIG. 4 indicates reading of data portions from the data queues 12a, 12b to be sent to the respective remote units 11a, 11b. The size of the all data portions is predetermined and is relatively small, (e.g. in the order of 1.5 kB, for example for Ethernet packets). For each stream of data portions a streaming rate at which data portions are to be sent to the respective remote unit 11a, 11b is determined. For example, if the transferred data composition is a media file for video streaming applications, said streaming rate can be determined from known time codes, for example PCR (programme clock reference), used in multimedia display methods, and included in such a media file. Alternatively, the streaming rate can be the same for all communications sessions, or for the sessions in a sub-set of all sessions.

The scheduling device 407 is adapted to determine, as indicated in FIG. 4 with the arrow P4, from which of the data queues 12a, 12b data is to be retrieved next. Thereby, determinations whether to send data portions from the data queues, or a sub-set of the data queues, is made in a cyclic manner, each determination being based on the streaming rate for the respective data queue. This cyclic series of determinations involves the use of a calendar or a table, stored accessible to the scheduling device 407, and containing for each data queue 12a, 12b information regarding the streaming rate set for the corresponding communication session, and the time or an identity of the clock cycle in which a data portion was retrieved last from the data queue. At the determination concerning a certain data queue 12a, 12b whether to retrieve a data portion from it, the scheduling device 407 determines the amount of time, or clock cycles, that has lapsed since the last data portion retrieval from the data queue, and compares this to the streaming rate.

It should be noted that said cyclic series of determinations whether to retrieve data from the data queues can be done within sub-sets of the data queues, rather than for all data queues, such data queue sub-set retrieval algorithms being followed by a suitable arbitration scheme, such as round-robin, for selecting data packets from the different data queue sub-sets.

The networking unit 4 comprises a networking element 423, which is adapted to receive the data portions from the data queues 12a, 12b, and to access the RAM memory 401 for mapping of the respective internal identification of the communication session with the respective communication session network address, to create based thereon data packets with the respective data portions and headers with the respective network addresses, and to send the data packets to the respective remote units 11a, 11b. This, the apparatus send from each data queue one data portion at the time interleaved with data portions from the other data queues, resulting, as mention above in avoiding data bursts that could cause congestions in the network.

Figure 6:
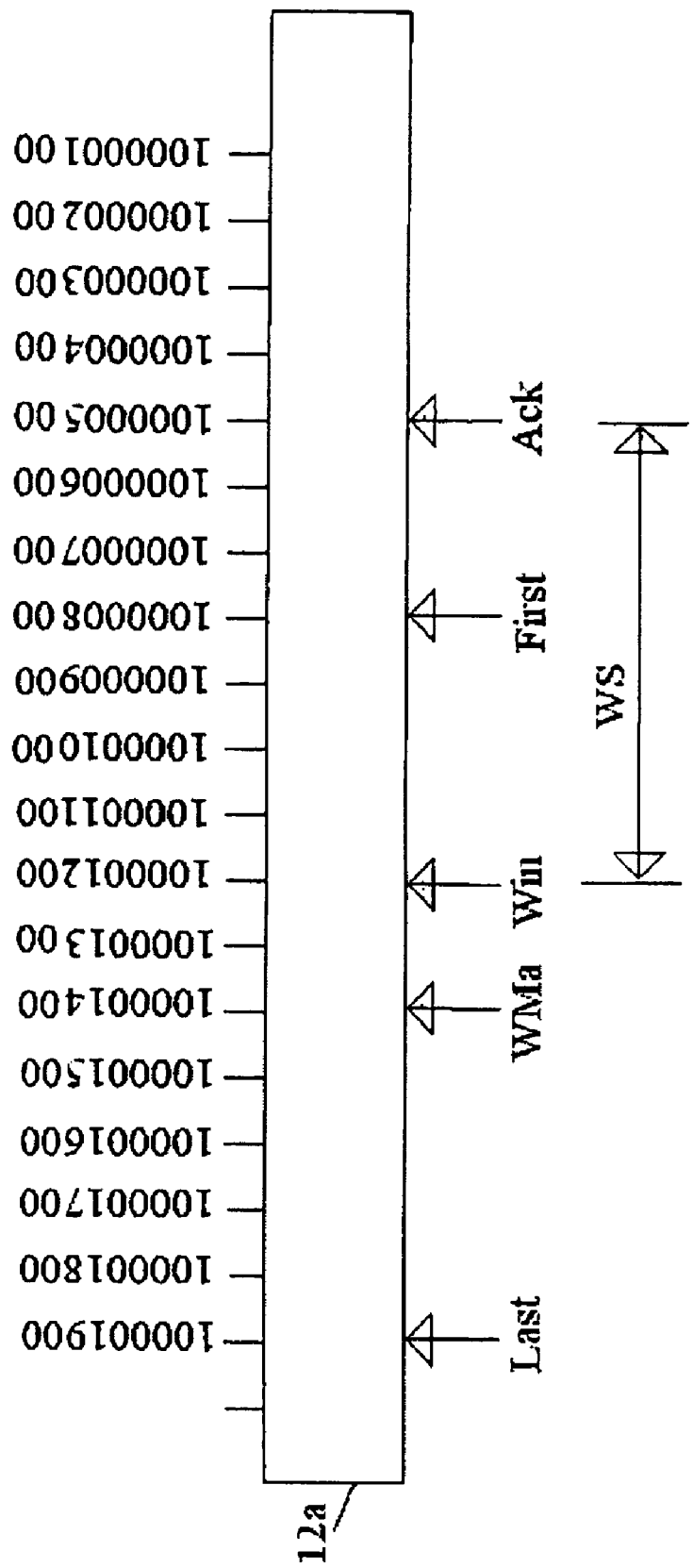
FIG. 6 is an illustration of a data queue in the apparatus in FIG. 2.

FIG. 6 shows a more detailed representation of one of the data queues 12a in FIG. 4. The headers of the data packets created by the networking element 423, includes according to TCP sequence numbers indicative of the respective byte number of the first byte in the respective data payload, i.e. the respective data portion in the respective data packet. The networking unit 4 is adapted to map these sequence numbers to the data stored in each data queue 12a, 12b, and as an example, byte numbers 100000100-100001900 are represented at the data queue 12a in FIG. 6. At the above mentioned allocation of data queues at initialization of the communication sessions, the scheduling device 407 is adapted to establish at each data queue a number of pointers, as follows: A pointer at the data queue 12a is in FIG. 6 denoted "Last" and indicates the data received most recently by the data queue 12a. A further pointer denoted "First" indicates data that is to be sent next. As data is retrieved from the data queue, the "First" pointer is moved accordingly.

Figure 7:
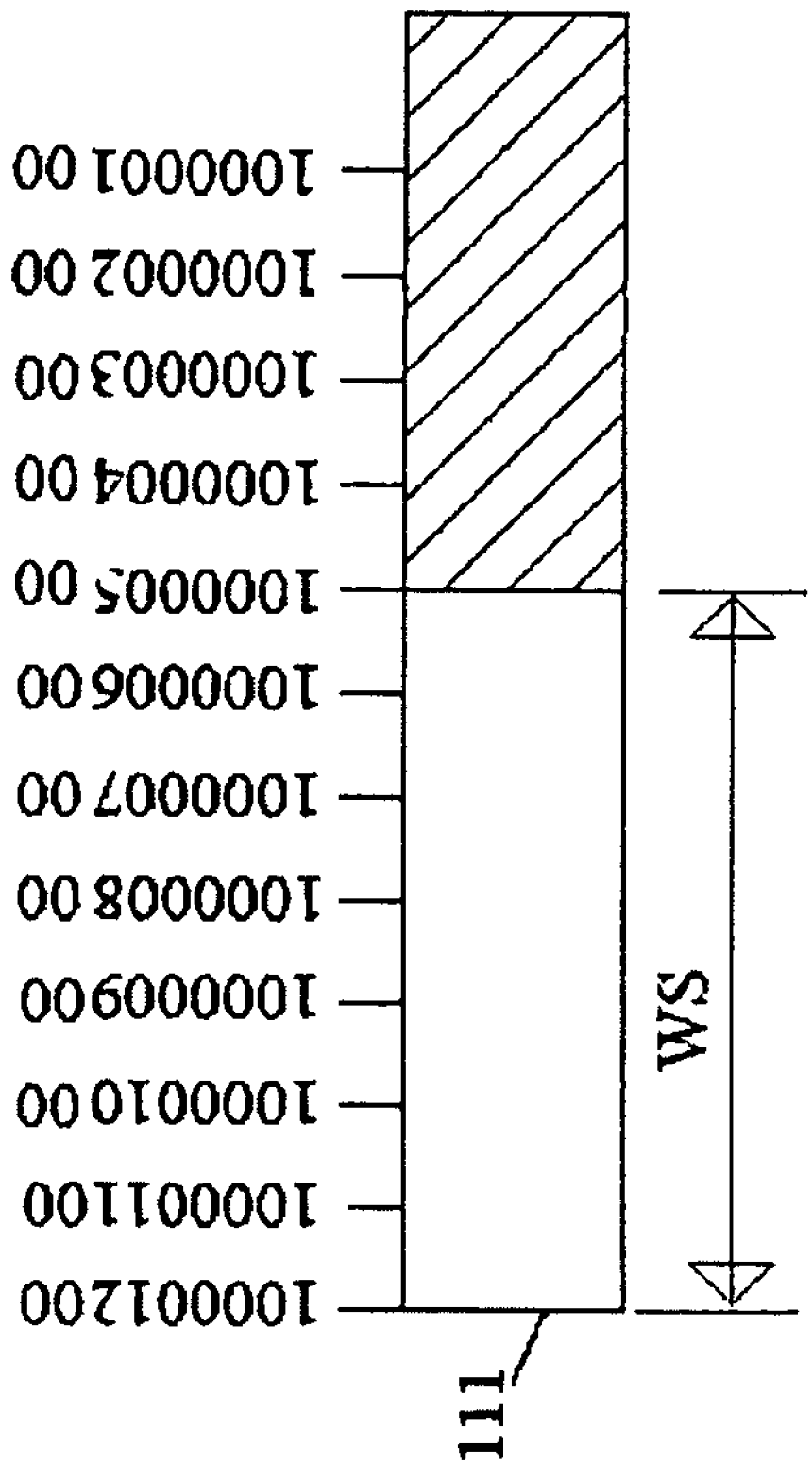
FIG. 7 depicts a receiving buffer of a remote unit connected to the communications network in FIG. 1.

Reference is made to FIG. 7. Each remote unit 11a, 11b comprises according to known art a receiving buffer 111 for storing data received from the communications network. FIG. 7 shows such a receiving buffer 111 of one of the remote units 11a, 11b. Data received is indicated in FIG. 7 with hatching. In a cumulative acknowledgment scheme according to TCP, the remote unit 11a, 11b receiving a stream of data will send upon reception of each data packet an acknowledgment data set signifying that it has received all data preceding the acknowledged data packet. More specifically, the acknowledgement data set includes, in addition to a so called ACK-flag, an acknowledgement number which is the byte number of the next expected byte in the stream of data portions.

Also, according to TCP, the remote unit 11a, 11b receiving a stream of data will send upon reception of each data packet, a windows update, or a window size WS, indicating the size of free buffer space in the receiving buffer 111.

The classifier 422 (FIG. 4) is adapted to detect in data packets received by the apparatus ACK-flags, to extract the respective byte number of the respective acknowledgement data set and the respective window size WS, and to map, with the aid of the RAM memory 401, the respective network address to the internal identity of the communication session. The classifier 422 is further adapted to forward the respective byte number, the respective window size WS, and the respective internal identity of the communication session to the scheduling device 407.

Reference is made again to FIG. 6. The scheduling device 407 is adapted to adjust, upon receiving the respective internal identity of the communication session, the respective byte number, and the respective window size WS, an acknowledgement pointer at the corresponding data queue 12a denoted "Ack" in FIG. 6, so as to point at the byte number included in the acknowledgement data set. The "Ack" pointer indicates that all data preceding it in the data queue has been acknowledged. Data that falls outside of the "Ack" pointer can be freed from the buffer of the data queue.

The scheduling device 407 is further adapted to adjust a window size pointer, denoted "Win" in FIG. 6, so that be located at a distance from the acknowledgement pointer, "Ack", corresponding to the window size WS.

The "First" pointer is not allowed to move past the window size pointer, "Win", in the direction of the "Last" pointer. Even if the distance between the "First" pointer and the window size pointer, "Win", is larger than one or more data portions, at each retrieval from the data queue 12a, only data corresponding to the predetermined size of a data portion is retrieved. If the "First" pointer ends up in the same position as the window size pointer, "Win", no further data is retrieved from the data queue 12a, until the distance between the "First" pointer and the window size pointer, "Win", is larger that one or more data portions.

A resending function is provided by the scheduling device 407 being adapted to provide for each data queue a time-out function, by means of a clock counter. When the first data portion in the communication session is retrieved from the data queue the counter starts. Thereafter, each time an acknowledgement data set is received for the data queue, the counter starts over. If within a predetermined time-period, or a predetermined number of clock cycles, from a start of the counter, an acknowledgement data set has not been received for the data queue, a data portion from the position of the "Ack" pointer will be again retrieved and sent. Preferably, in addition, the streaming rate in the sending of data portions from the position of the "First" pointer to the remote unit can be reduced until an acknowledgement data set, the absence of which caused a data portion from the position of the "Ack" pointer to be sent again, has been received.

Figure 8:
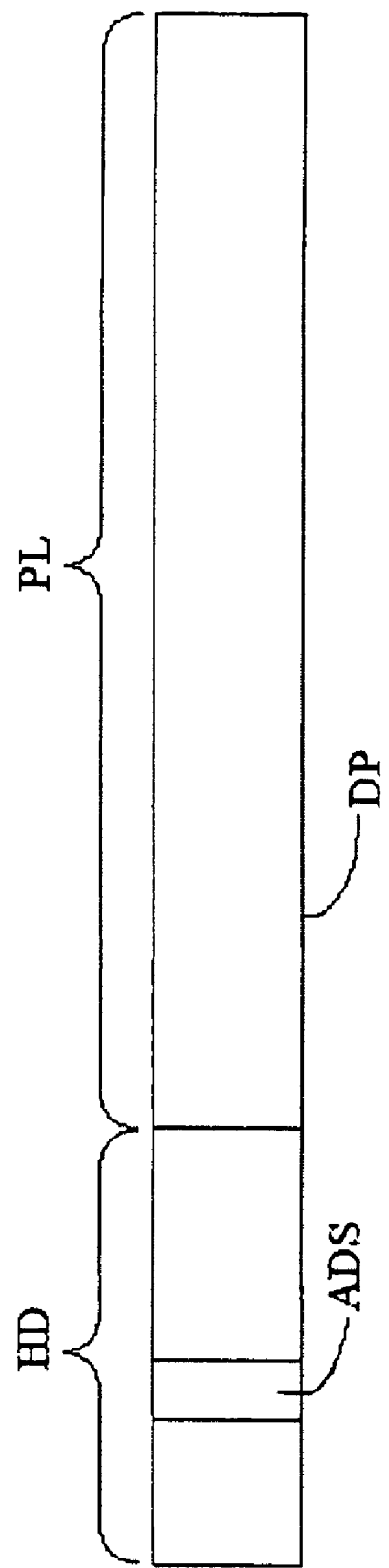
FIG. 8 shows a data packet received by the apparatus in FIG. 2.

Reference is made to FIG. 8 acknowledgement data sets would in most embodiments of the apparatus mostly be included in data packets with communication control data only, i.e. without any payload data. However, as depicted in FIG. 8, an acknowledgement data set can be included in a data packet DP, from the remote unit, with a header HD and a payload data portion PL including a message, at which the acknowledgement data set ADS is included in the header HD of the data packet DP. The payload data portion PL can contain data which is not directly intended for the sending of the data from the data queues 12a, 12b. For example, the payload data portion PL might be intended for the control unit 6, and will in such cases be forwarded to the latter.

The control unit 6 is adapted to generate upon receiving a message from a remote unit 11a, 11b, according to TCP, an acknowledgement data set similar to the ones described above. The control unit 6 is adapted to forward such acknowledgement data sets, together with the internal identity of the communication session in question, to the networking element 423, as indicated in FIG. 4 with the arrow L4. Until a further message is received from the remote unit, the acknowledgement data set from the control unit 6 is included in all data packet headers sent to the remote unit. As an exception, if the stream of data portion to the remote unit is halted, for example, where the data composition is a video file, due to a previous "pause" trick-play command from the remote control unit, the control unit 6 is adapted to forward its acknowledgement data set, together with the internal identity of the communication session in question, to the scheduling device 407, as indicated in FIG. 4 with the arrow L3, so as to be sent to the remote unit.

Reference is made to FIG. 2 and FIG. 4. The apparatus 1 is adapted to store in one or more of the data queues 12a, 12b, along with data of the respective stream of data composition sub-sets, message data sets, intended for the respective remote unit. Such a message data set can be such that it is not included in the respective data composition. Instead it can relate to other matters. For example, the remote unit can send a message indicating an inquiry as to whether a certain data composition can be made available by the apparatus 1, and the message data set from the can be a response to the inquiry indicating that the data composition is, or is not, available.

The message data set can be generated by the control unit 6, and sent, together with data identifying a data queue 12a, 12b, to the output memory 12 as indicated by the arrow L3, to be stored in the identified data queue 12a, 12b, as indicated in FIG. 4 by the arrow M4. Thereby, no separate connection for such message data sets has to be established, since the above described communication sessions for transfer of data compositions can be used for the transfer of the message data set as well. Preferably, the message data set is provided together with a header and possibly a tail; with data from which the message data set can be distinguished from the data originating from the storage unit 7.

Figure 9:
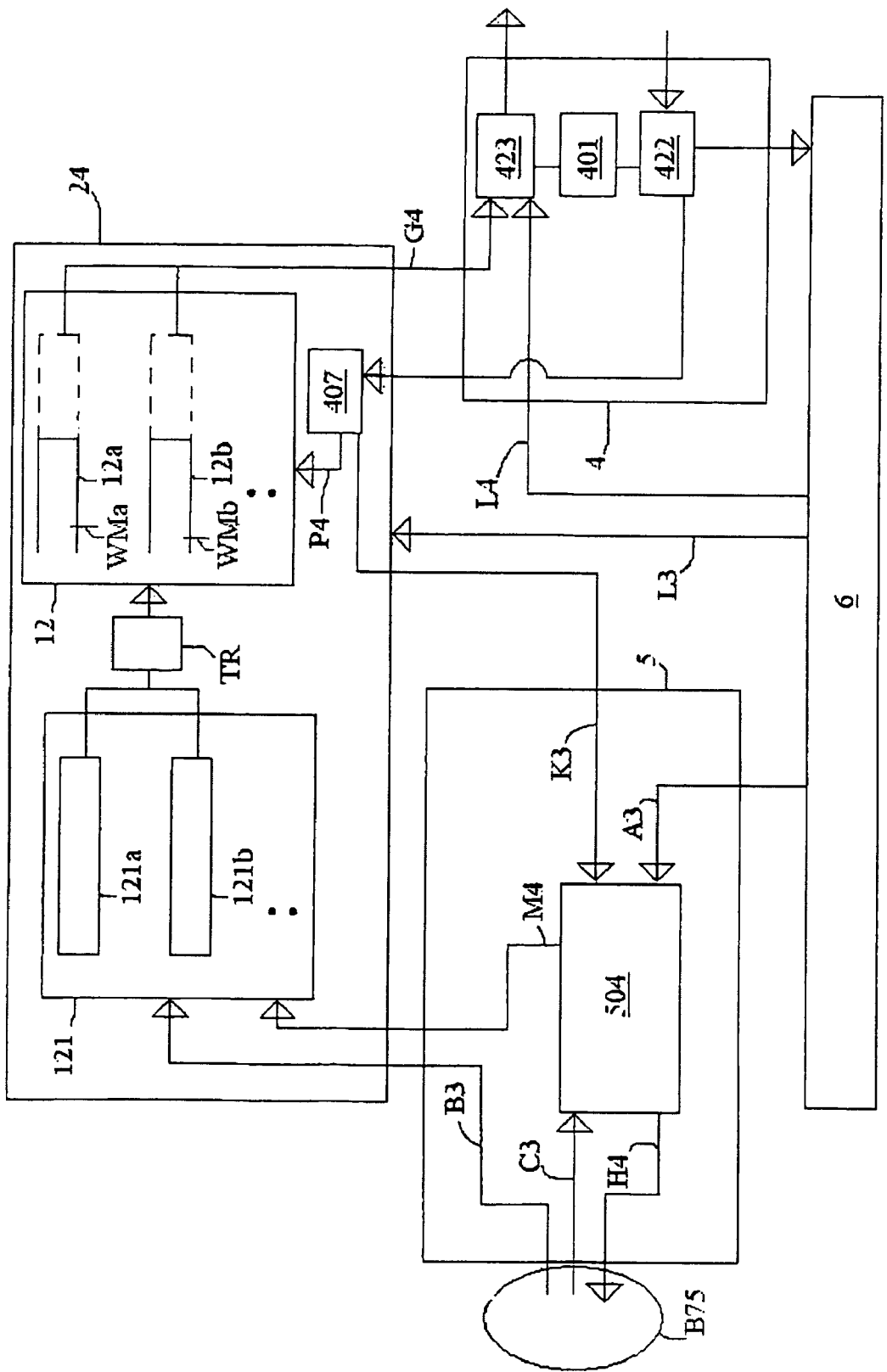
FIG. 9 is a block diagram, corresponding to the one in FIG. 4, of parts of an apparatus according to an alternative embodiment of the invention.

FIG. 9 is a block diagram, corresponding to the one in FIG. 4, of parts of an apparatus according to an alternative embodiment of the invention, similar to the one described with reference to FIG. 4, except for the following: The apparatus comprises an intermediate memory unit 121, which could be part of the same physical unit as the output memory 12, or provided as a separate unit. The intermediate memory 121 presents a plurality of intermediate buffers 121a, 121b corresponding to the plurality of communication sessions, and allocated similarly to the data queues as mentioned above. The retrieval unit 5 is adapted to send the retrieved data composition sub-sets 91a, 91b to the intermediate memory 121, as indicated by the arrow B3 in FIG. 9. The data composition sub-sets 91a, 91b of each communication session is stored in a respective of the intermediate buffers 121a, 121b. The data composition sub-sets 91a, 91b is thereafter sent from the intermediate buffers 121a, 121b to the corresponding data queues 12a, 12b in the output memory 12. This provides for some processing of the data, as indicated in FIG. 9 with a block TR, before being stored in the output memory 12. Such processing could for example include adding of headers according to the Real Time Streaming Protocol (RTSP). The arrangement in FIG. 9 also facilitates the inclusion of message data sets from the control unit 6, as indicated with the arrow L3.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of using a plurality of simultaneous communication sessions to allow two-way communication where data compositions are simultaneously sent from an apparatus to a large plurality of remote units, while maintaining a high performance of the apparatus, each session involving sending at least part of a data composition to corresponding ones of the plurality of remote units through a communication network, the data compositions being stored in a storage unit, the method comprising the steps of:

in a hard-coded networking unit, receiving from a remote unit a data packet with a header including according to the Transmission Control Protocol (TCP) a SYN-flag;

by means of a classifier comprised in the hard-coded networking unit, detecting the SYN-flag, extracting from the data packet a network address of the remote unit, mapping an internal identification with the communication session, and communicating the internal identification of the communication session;

by means of a scheduling device connected to the classifier, receiving the internal identification of the communication session from the classifier;

by means of the hard-coded networking unit, sending in response to the received data packet with the SYN-flag to the remote unit, a data packet acknowledging the reception of the data packet with the SYN-flag, and receiving from the remote unit an acknowledgement of the acknowledgement of the data packet with the SYN-flag;

in the hard-coded networking unit, receiving a request for at least a part of a data composition from the remote unit;

by means of the classifier, determining whether the received request comprises an acknowledgement data set (ADS) and if so, sending the acknowledgement data set (ADS) to the scheduling device, the acknowledgement data set (ADS) signifying that the remote unit has received all data preceding the acknowledged data packet;

by means of the classifier, from the received request determining the identity of the data compositions and the internal identification of the communication session, and forwarding the identity and the internal identification to a control unit connected to the hard-coded networking unit;

by means of the control unit, determining whether the requested data composition is stored in the storage unit;

by means of a link device connected to the control unit, to the storage unit and to the scheduling device, sending a read request to the storage unit if the requested data composition is stored in the storage unit;

in an output memory connected to the storage unit and to the scheduling device, receiving from the storage unit a plurality of streams of data composition sub-sets of respective data compositions, and providing for each of the communication sessions a data queue, and storing data of the streams of data composition sub-sets in the data queues, by means of the scheduling device, providing acknowledgement pointers (Ack) at the data queues, by means of a networking element comprised in the networking unit and connected to the output memory, retrieving data portions from the data queues and sending streams of the data portions to the respective remote units, by means of the classifier, receiving streams of acknowledgement data sets (ADS) from the respective remote units, from which acknowledgement data sets (ADS) reception by the respective remote unit of data portions can be determined and sending the acknowledgement data sets (ADS) to the scheduling device, and by means of the scheduling device, adjusting, upon receiving the acknowledgement data sets (ADS), the acknowledgement pointers (Ack) at the data queues corresponding to the remote units from which the acknowledgement data sets (ADS) where received.

2. The method according to claim 1, comprising receiving from the storage unit, for each stream of data composition sub-sets, a stream of control data sub-sets, each control data sub-set comprising data corresponding to a location in the storage unit of a further data composition sub-set in the respective stream of data composition sub-sets.

3. The method according to claim 1, wherein the size of the data portions retrieved from each data queue is predetermined, and a streaming rate at which data portions are to be sent to the respective remote unit is determined for the streams of data portions, and/or for at least one group of streams of data portions.

4. The method according to claim 3, wherein determinations whether to send data portions from the data queues, or a sub-set of the data queues, is made in a cyclic manner, each determination being based on the streaming rate for the respective data queue.

5. The method according to claim 3, comprising providing at each data queue a window size pointer (Win), indicative of the maximum amount of data that is allowed to be sent without reception of the data by the respective remote unit having been determined.

6. The method according to claim 1, comprising the step of adjusting, during a communication session, a rate in the sending of data portions to a remote unit.

7. The method according to claim 1, comprising the step of storing in at least one of the data queues, along with data of the respective stream of data composition sub-sets, a message data set.

8. An apparatus participating in a plurality of simultaneous communication sessions to allow two-way communication where data compositions are simultaneously sent from the apparatus to a large plurality of remote units, while maintaining a high performance of the apparatus, each session involving sending at least parts of a data composition to a respective of a plurality of remote units through a communication network, the data compositions being stored in a storage unit, the apparatus comprising:

a hard-coded networking unit configured to receive from a remote unit a data packet with a header including according to the Transmission Control Protocol (TCP) a SYN-flag;

a classifier comprised in the hard-coded networking unit and configured to detect the SYN-flag, to extract from the data packet a network address of the remote unit, to map an internal identification with the communication session, and to communicate the internal identification of the communication session;

a scheduling device connected to the classifier and configured to receive the internal identification of the communication session from the classifier;

the hard-coded networking unit is further configured to send in response to the received data packet with the SYN-flag to the remote unit, a data packet acknowledging the reception of the data packet with the SYN-flag, and to receive from the remote unit an acknowledgement of the acknowledgement of the data packet with the SYN-flag;

the hard-coded networking unit is further configured to receive a request for at least a part of a data composition from the remote unit;

the classifier is further configured to determine whether the received request comprises an acknowledgement data set (ADS) and if so, to send the acknowledgement data set (ADS) to the scheduling device, the acknowledgement data set (ADS) signifying that the remote unit has received all data preceding the acknowledged data packet;

the classifier is further configured to determine, from the received request, the identity of the data compositions and the internal identification of the communication session, and to forward the identity and the internal identification to a control unit connected to the networking unit;

the control unit is configured to determine whether the requested data composition is stored in the storage unit;

a link device connected to the control unit, to the storage unit and to the scheduling device, the link device is configured to send a read request to the storage unit if the requested data composition is stored in the storage unit;

an output memory connected to the storage unit and to the scheduling device, the output memory is configured to receive from the storage unit a plurality of streams of data composition sub-sets of respective data compositions, and to provide for each of the communication sessions a data queue, and to store data of the streams of data composition sub-sets in the data queues, the scheduling device is further configured to provide acknowledgement pointers (Ack) at the data queues;

a networking element comprised in the networking unit and connected to the output memory, the networking element is configured to retrieve data portions from the data queues and to send streams of the data portions to the respective remote units;

the classifier is further configured to receive streams of acknowledgement data sets (ADS) from the respective remote units, from which acknowledgement data sets (ADS) reception by the respective remote unit of data portions can be determined and to send the acknowledgement data sets (ADS) to the scheduling device; and the scheduling device is further configured to adjust, upon receiving the acknowledgement data sets (ADS), the acknowledgement pointers (Ack) at the data queues corresponding to the remote units from which the acknowledgement data sets (ADS) where received.

9. The apparatus according to claim 8, wherein the link device is hard-coded to receive from the storage unit, for each stream of data composition sub-sets, a stream of control data sub-sets, each control data sub-set comprising data corresponding to a location in the storage unit of a further data composition sub-set in the respective stream of data composition sub-sets.

10. The apparatus according to claim 8, wherein the scheduling device is hard-coded to retrieve data portions with a predetermined size from the data queues, and to determine for the streams of data portions, and/or for at least one group of streams of data portions, a streaming rate at which data portions are to be sent to the respective remote unit.

11. The apparatus according to claim 10, wherein the scheduling device is hard-coded to make determinations whether to send data portions from the data queues, or a sub-set of the data queues, is made in a cyclic manner, each determination being based on the streaming rate for the respective data queue.

12. The apparatus according to claim 10, wherein the scheduling device is hard-coded to provide at each data queue a window size pointer (Win), indicative of the maximum amount of data that is allowed to be sent without reception of the data by the respective remote unit having been determined.

13. The apparatus according to claim 8, wherein the scheduling device is hard-coded to adjust, during a communication session, a rate in the sending of data portions to a remote unit.

14. The apparatus according to claim 8, adapted to store in at least one of the data queues, along with data of the respective stream of data composition sub-sets, a message data set.

* * * * *